(12) United States Patent
Smith et al.

(10) Patent No.: US 9,339,140 B2
(45) Date of Patent: May 17, 2016

(54) ZESTER WITH SCRAPER ASSEMBLY

(71) Applicants: Richard S Smith, Hot Springs, AR (US); Louis Chalfant, Hot Springs, AR (US)

(72) Inventors: Richard S Smith, Hot Springs, AR (US); Louis Chalfant, Hot Springs, AR (US)

(73) Assignee: Smith's Consumer Products, Inc., Brentwood, TN (US)

(*) Notice: Subject to any disclaimer, the term of this patent is extended or adjusted under 35 U.S.C. 154(b) by 0 days.

(21) Appl. No.: 13/913,476

(22) Filed: Jun. 9, 2013

(65) Prior Publication Data

US 2013/0341448 A1    Dec. 26, 2013

Related U.S. Application Data

(63) Continuation of application No. 12/658,631, filed on Feb. 9, 2010, now abandoned.

(60) Provisional application No. 61/202,245, filed on Feb. 9, 2009.

(51) Int. Cl.
*A47J 17/02* (2006.01)
*A47J 43/25* (2006.01)

(52) U.S. Cl.
CPC . *A47J 17/02* (2013.01); *A47J 43/25* (2013.01)

(58) Field of Classification Search
USPC ................................ 99/588–590; 241/273.1
See application file for complete search history.

(56) References Cited

U.S. PATENT DOCUMENTS

| | | | | |
|---|---|---|---|---|
| 2,282,660 A | * | 5/1942 | Lee | 99/567 |
| 2,702,503 A | * | 2/1955 | Wildhaber | 454/252 |
| 2,720,234 A | * | 10/1955 | Fett | 241/273.1 |
| 4,393,758 A | * | 7/1983 | Anmahian | 99/450.6 |
| 4,753,159 A | * | 6/1988 | Eaton | 99/567 |
| 5,108,771 A | * | 4/1992 | Bannister | 426/482 |
| 5,765,472 A | * | 6/1998 | Kim | 99/537 |

* cited by examiner

*Primary Examiner* — Melba Bumgarner
*Assistant Examiner* — Amir Klayman
(74) *Attorney, Agent, or Firm* — Edward D. Gilhooly

(57) ABSTRACT

A zester having an elongated body with a handle portion at one end and a cutting portion form by a plurality of raised cutting elements at the other end portion. A lower member is moveably mounted on said body beneath said plurality of cutting elements to form a collection chamber. A flexible squeegee is affixed to said lower member to scrape zest material from beneath the cutting elements as the lower member is extended outward from the housing after use of the zester.

13 Claims, 8 Drawing Sheets

ZESTER WITH SCRAPER ASSEMBLY

This application claims priority to provisional application Ser. No. 61/202,245 filed Feb. 9, 2009.

BACKGROUND OF THE INVENTION

1. Field of the Invention

This invention relates to food preparation tools, and more particularly, to an implement for removing zest from citrus rinds and having a scraper for removing zest.

2. Summary of the Prior Art

The rinds of citrus fruits add flavors to many food recipes. Zest is the colored part of the rind of a lemon, lime, orange, and the like which produces flavorful oils, without the bitter white pith of the fruit. Knives and graters have been used to obtain zest from fruit, but their use often produces an unattractive zest product including the presence of bitter pith. Implements known as zesters are the preferred tool for producing zest. Zesters are capable of making thin, attractive strips of zest without the presence of pith. One major drawback inherent in known zesters is the absence of an effective zest removal technique to extract and collect the zest produced by the zester. Generally, prior art zesters require manual removal by the user or use of a separate implement to extract the zest produced. Such a removal technique for zesters is inconvenient, relatively ineffective, and messy. For these reasons, it is desirable in the prior art to provide an improved zester having a convenient to use and effective zest removal capability.

SUMMARY OF THE INVENTION

It is therefore an objective of the invention to provide an improved zester having a zest removal system. The invention herein includes a top plate having a cutting surface formed by multiple raised cutting elements over respective openings to extract strips of the rind without pith to form zest as the food item is moved along the cutting surface. The invention includes a convenient manual manipulation of the implement as needed during the extraction of zest from the fruit. A lower slidable chamber includes a squeegee for contacting the underside of the holes of the top cutting surface for effective removal and collection of the zest product from the zester. The slidable chamber is simply extended outward from the zester to scrape the product by contact with squeegee.

DESCRIPTION OF THE PREFERRED EMBODIMENT

Figure 1:
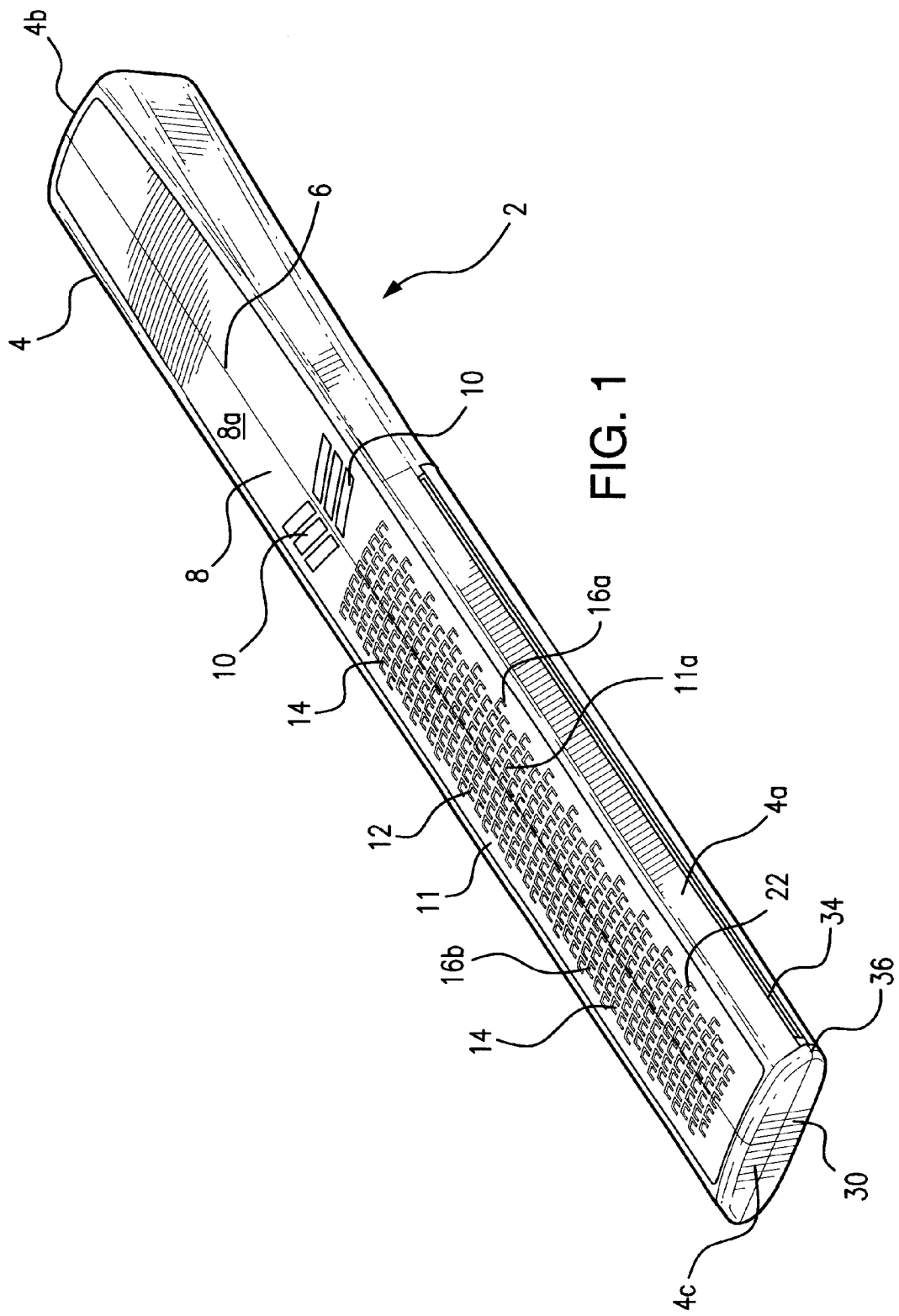
FIG. 1 is a top perspective view of the zester of the invention.

Referring now to FIGS. 1-8, there is illustrated the zester of the invention, generally designated by reference numeral 2.

Figure 2:
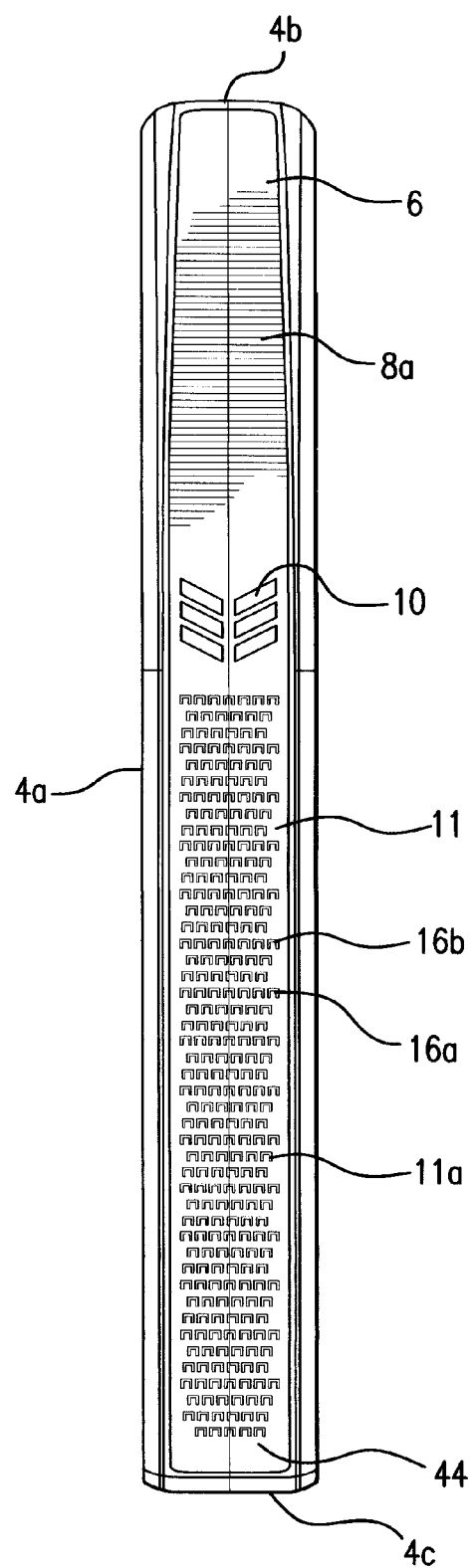
FIG. 2 is a top plan view of the zester of FIG. 1.
Figure 3:
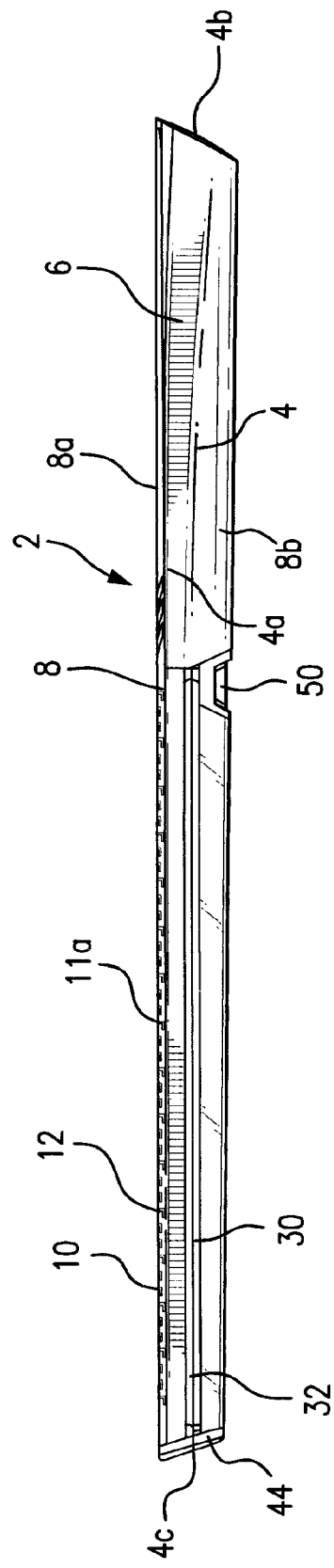
FIG. 3 is a side elevation view of the zester of FIG. 1.
Figure 4:
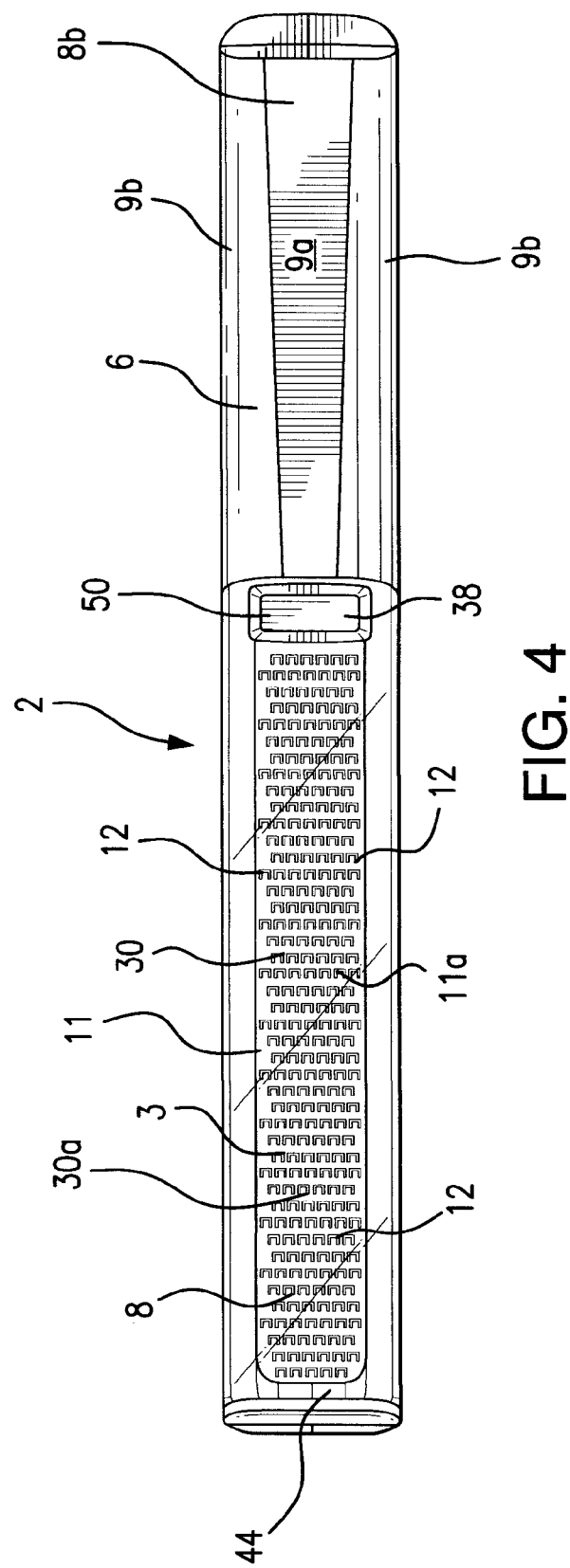
FIG. 4 is a bottom plan view of the zester of FIG. 1.
Figure 5:
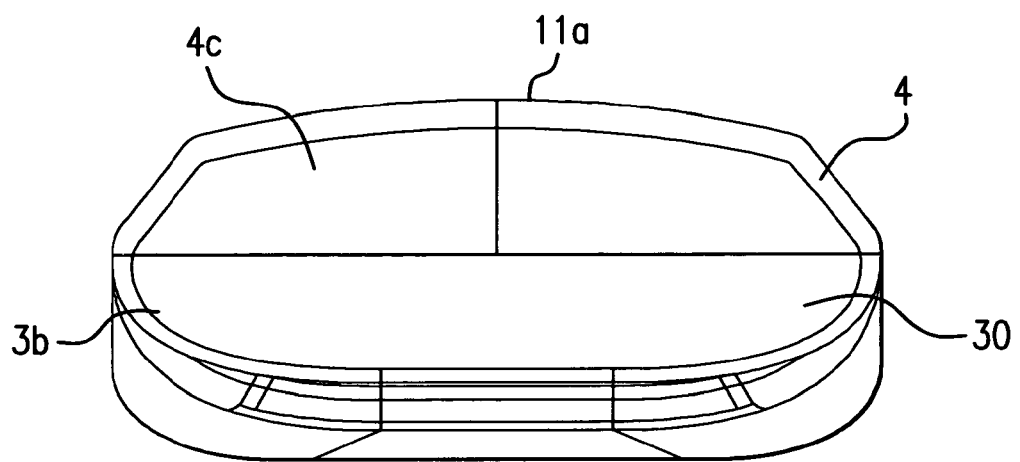
FIG. 5 is a right end elevation view, viewing FIG. 3, of the zester of FIG. 1.
Figure 6:
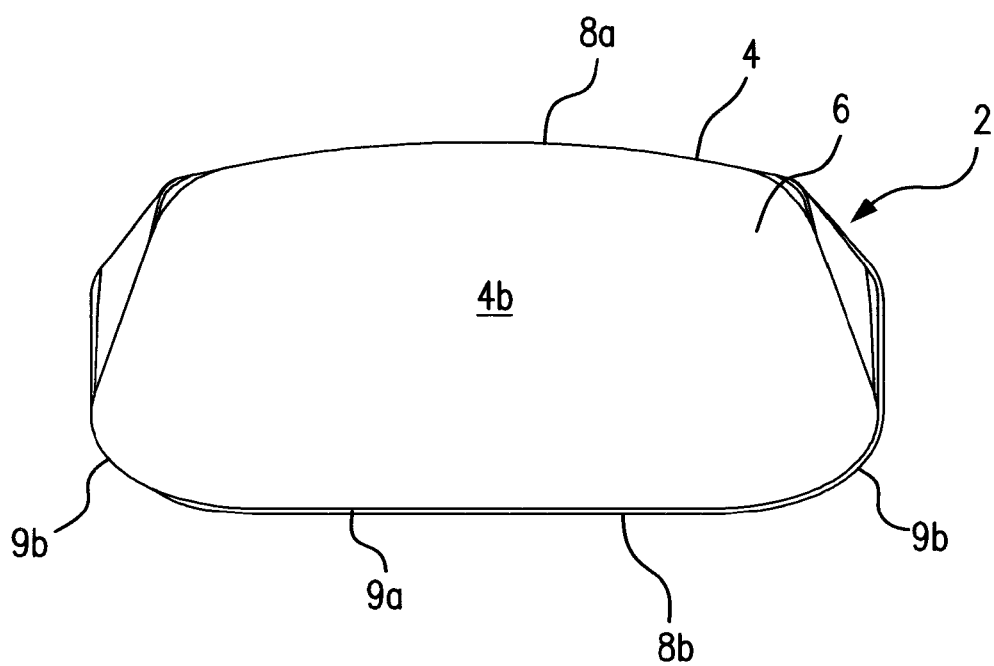
FIG. 6 is a left end elevation view, viewing FIG. 3, of the zester of FIG. 1.

The zester 2 has an upper elongated body 4 formed with an integral handle 6 at one end. The body 4 includes spaced sidewalls 4a and opposite end walls 4b, 4c. As seen in FIG. 3, the body 4 has a moderate bowed configuration from the side view. A metal plate 8 is affixed to the top of body 4 and extends a substantial portion of the length of the body 4. As seen in FIG. 5, the top surface 8a of the plate 8 acts as the top work surface of the handle 6 at one end. A series of frictional strips 10 are affixed to top surface 8a and act as a thumb grip during the use of zester 2. The bottom surface 8b of the handle 6 is formed with a generally flat central portion 9a and curved edge portions 9b and is also frictionized by a rubber or plastic material for a better grip (FIGS. 3, 4 and 5). As seen in FIGS. 1 and 2, the top surface 11 of the plate 8 forms a moderately convex work surface 11a having a generally identical array 12 of cutting elements 14 arranged in lateral rows 16a and 16b (FIGS. 1 and 2) extending from adjacent one end of body 4 to an intermediate portion of the body 4 adjacent the handle portion 6. As seen in FIGS. 3 and 8 rows 16a have more cutting elements 14 than rows 16b. The edges 22 of the cutting elements 14 are integrally cut out of upper plate 8 through surface 11a to form holes 20 FIGS. 7 and 8) beneath the cutting elements for receiving the zest as the rind of the fruit is cut. The upper sloped cutting edges 22 of the cutting elements 14 are raised above the work surface 11a at a precise distance to insure that only strips of rind are cut and not pith of the fruit. As seen in FIG. 3, the cross section of the cutting elements is generally rectangular in shape. It is within the scope of the invention to employ other shapes of the cutting element than as shown, such as, for example, domed, triangular or other suitably shaped raised cutting elements. In use of the zester 2, it should be apparent that the fruit is manually moved along work surface 11a in contact with cutting elements 14 to extract zest.

Figure 7:
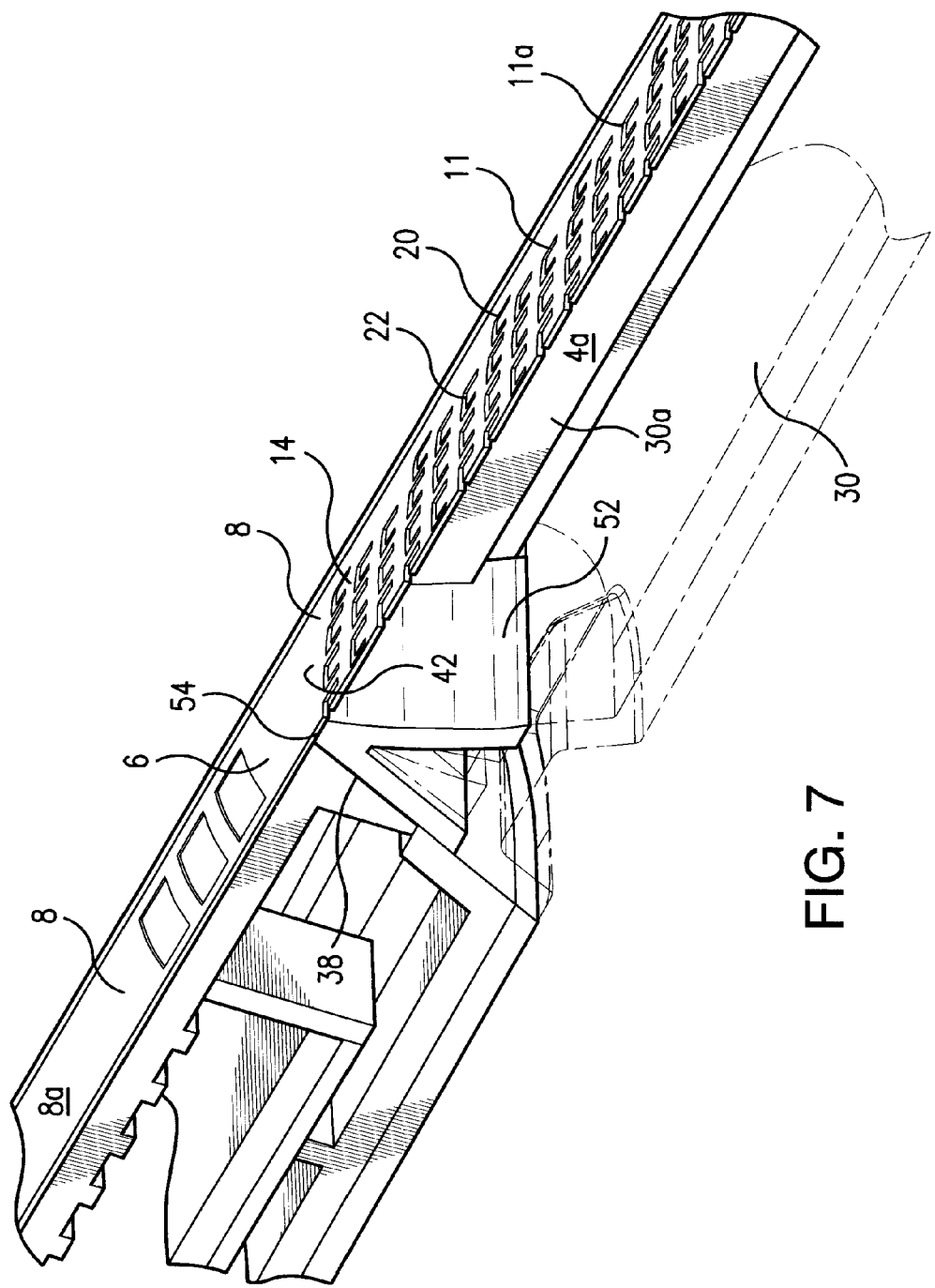
FIG. 7 is a side partial perspective view, with parts removed, of the zest removal assembly, of the zester of FIG. 1.
Figure 8:
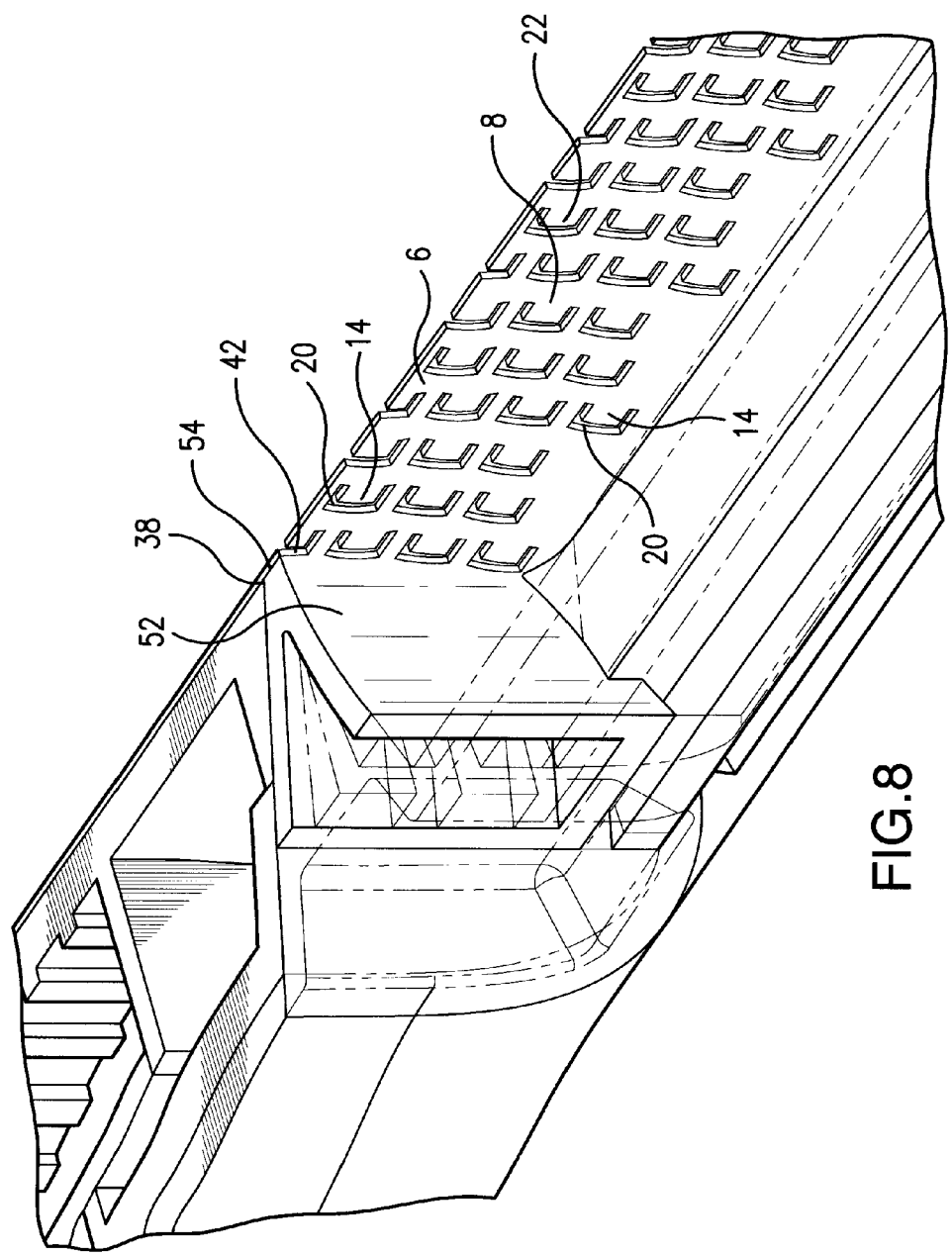
FIG. 8 is a bottom partial perspective view, with parts removed, of the zest removal assembly, of the zester of FIG. 1.

Referring to FIGS. 5, 7 and 8, a lower member 30 having a generally U-shaped cross sectional shape is slideably mounted on housing 4 beneath the surface 11a of the metal plate 8 on which the cutting elements 14 are present. In its retracted position as seen in the bottom view of FIG. 4, the lower member 30 forms a chamber 30a beneath upper work surface 11a and holes 20. In FIG. 4, it should be noted the lower housing 30 is shown as being transparent allowing a view of the chamber 30a and plate 8, but other non-transparent materials may be used in the fabrication of the lower housing 30. The side wall 4a of the housing 4 forms a grove 34 (FIGS. 1 and 3) along the length of the work surface 11a of plate 8 to slidably receive side portions 36 of the lower member 30 and allow the inner end 38 (FIGS. 7 and 8) of the lower housing 30 to move below the work surface 11a from the withdrawn position of the member 30 as shown in FIG. 4 to a fully extended position from the body 4 (not shown) whereby inner end 38 is situated adjacent to the end portion 42 of work surface 11a. The lower housing 30 can then be removed for collection of the zest.

Manual movement of the lower member 30 is facilitated by the presence of lower depression 50. A scraper 52 in the form of a flexible squeegee 52, fabricated from a rubber or plastic material is internally mounted in chamber 30a on lower member 30 adjacent end 38 and is situated in back of the array of holes 20 in the closed, withdrawn position of the lower member 30 in FIG. 3. As illustrated in FIGS. 7 and 8 the scraper 52 has a generally V-shaped cross section terminating with a flat apex edge 54. The scraper 52 is formed with triangular shaped end walls (not shown) for reinforcement. Alternatively, the scraper 52 may be formed as a solid configuration having a triangular cross section or other shape providing an upper scraping edge. The apex edge 54 contacts the bottom surface of plate 8 adjacent holes 20 and as the lower housing 30 is extended outward from housing 4 the apex edge 52 contacts the lower surface and scrapes off zest for collection in the lower member 30.

What is claimed is:

1. A food cutting tool for collecting material cut from a food item comprising
    a body having an upper plate to form a upper surface, opposed sidewalls and a bottom surface, at least a portion of said upper surface including a plurality of raised cutting elements disposed adjacent a respective opening to form a plurality of openings through said upper plate and being arranged to receive cut material from a food item in contact with said plurality of cutting elements,
    a lower member being mounted on said body beneath said upper surface for selective sliding movement relative said body between a retracted position beneath said plurality of raised cutting elements to an extended position disposed away from said body, said lower member forming a chamber in said retracted position for receiving material through said plurality of openings from the food item cut by said plurality of cutting elements and
    a scraper affixed to said lower member and having a upper surface generally in constant contact with said bottom surface of said body during said sliding movement of said lower member, whereby said upper surface of said scraper scrapes off cut adhering material from said bottom surface of said body during said movement for collection in said chamber.

2. The food cutting tool of claim 1 wherein said plurality of raised cutting elements extend on said upper plate from adjacent an end of said body to an intermediate portion of said body.

3. The food cutting tool of claim 2 wherein said scraper is moveable from said intermediate portion of said body to adjacent said end of said body during movement of said lower member.

4. The food cutting tool of claim 1 wherein said lower member includes upper portions engaging an open-ended longitudinal groove on respectively formed on said side walls.

5. The food cutting tool of claim 1 wherein said scraper is formed from a flexible material.

6. The food cutting tool of claim 5 wherein said scraper is a squeegee.

7. The food cutting tool of claim 4 wherein said body forms a handle adjacent said plurality of raised cutting elements, said handle being integral to said housing.

8. The food cutting tool of claim 1 wherein said tool is zester.

9. The food cutting tool of claim 1 wherein said scraper has a v-shaped cross section forming an apex to contact said bottom surface.

10. The food cutting tool of claim 1 wherein said plurality of cutting elements are arranged in lateral rows on said body.

11. A food cutting tool comprising
    an upper member having an upper surface and a lower surface extending between a first end portion and a second end portion of said upper member,
    at least a portion of said upper surface having a plurality of raised cutting elements disposed respectively adjacent a plurality of openings through said upper surface and said lower surface of said upper member,
    a movable lower member having sidewalls on said upper member beneath the portion of said upper surface movement between a retracted position of said lower member to an extended position of said lower member,
    said upper member having a handle portion
    an upright scraper being affixed to said lower member adjacent said first end portion of said upper member in said retracted position of said lower member and having a upper edge generally in contacting relation to said lower surface of said upper member during movement of said lower member, and
    said upper edge of said scrapper in continuous contact with said lower surface of said upper member during said movement from said retracted position to said extended position.

12. The food cutting tool according to claim 11 wherein an upper portion of said lower member extend into respective open-ended longitudinal grooves formed on said upper member.

13. The food cutting tool according to claim 12 wherein said upper member has a pair of spaced downwardly extending sidewalls generally in contact with said upper portions of said lower member.

* * * * *